United States Patent
Lee

(10) Patent No.: US 10,606,947 B2
(45) Date of Patent: Mar. 31, 2020

(54) SPEECH RECOGNITION APPARATUS AND METHOD

(71) Applicant: Samsung Electronics Co., Ltd., Suwon-si (KR)

(72) Inventor: Ji Hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 15/331,311

(22) Filed: Oct. 21, 2016

(65) Prior Publication Data
US 2017/0154033 A1    Jun. 1, 2017

(30) Foreign Application Priority Data
Nov. 30, 2015  (KR) .................. 10-2015-0168967

(51) Int. Cl.
*G10L 15/00*        (2013.01)
*G10L 15/16*        (2006.01)
(Continued)

(52) U.S. Cl.
CPC .......... *G06F 17/276* (2013.01); *G06F 17/218* (2013.01); *G06F 17/274* (2013.01);
(Continued)

(58) Field of Classification Search
CPC ....... G10L 15/02; G10L 15/063; G10L 15/14; G10L 15/183; G10L 15/22; G10L 15/32; G10L 25/30; G10L 15/07; G10L 15/1815; G10L 15/26; G10L 15/18; G10L 13/027; G10L 15/1807; G10L 15/197; G10L 17/00; G10L 17/22; G10L 2015/228; G10L 15/30; G10L 2015/227; G10L 15/16;
(Continued)

(56) References Cited

U.S. PATENT DOCUMENTS 8,589,163 B2   11/2013  Ljolje et al.
9,099,082 B2    8/2015  Kim et al.
(Continued)

FOREIGN PATENT DOCUMENTS

JP           4171323 B2    10/2008
JP         2013-250379 A   12/2013
(Continued)

OTHER PUBLICATIONS

Mohri, Mehryar, Fernando Pereira, and Michael Riley. "Weighted finite-state transducers in speech recognition." Computer Speech & Language 16.1 (2002): 69-88.
(Continued)

*Primary Examiner* — Michael Ortiz-Sanchez
(74) *Attorney, Agent, or Firm* — NSIP Law

(57) ABSTRACT

A speech recognition apparatus includes a predictor configured to predict a word class of a word following a word sequence that has been previously searched for based on the word sequence that has been previously searched for; and a decoder configured to search for a candidate word corresponding to a speech signal, extend the word sequence that has been previously searched for using the candidate word that has been searched for, and adjust a probability value of the extended word sequence based on the predicted word class.

25 Claims, 11 Drawing Sheets

(51) Int. Cl.
*G06F 17/27* (2006.01)
*G10L 15/26* (2006.01)
*G10L 15/183* (2013.01)
*G06F 17/21* (2006.01)
*G06N 3/04* (2006.01)

(52) U.S. Cl.
CPC ........ *G06F 17/278* (2013.01); *G06F 17/2735* (2013.01); *G10L 15/16* (2013.01); *G10L 15/183* (2013.01); *G10L 15/26* (2013.01); *G06N 3/0454* (2013.01)

(58) Field of Classification Search
CPC ......... G10L 15/28; G10L 15/06; G10L 15/10; G10L 15/20; G10L 2015/0631; G10L 2015/085; G10L 2015/223; G10L 15/187; G10L 15/19; G10L 15/265; G10L 17/14; G10L 17/16; G10L 2015/0633; G10L 2015/088; G06N 3/02; G06F 16/35; G06F 17/2785; G06F 17/2715; G06F 16/3344; G06F 17/2818; G06F 16/3334; G06F 16/3346; G06F 16/353; G06F 17/30707; G06F 17/30976
See application file for complete search history.

(56) References Cited

U.S. PATENT DOCUMENTS

| | | | |
|---|---|---|---|
| 9,305,545 B2 | 4/2016 | Cheung | |
| 9,558,743 B2* | 1/2017 | Coccaro | G10L 15/1822 |
| 9,613,619 B2* | 4/2017 | Lev-Tov | G10L 15/01 |
| 2004/0156562 A1* | 8/2004 | Mulvey | G06F 3/0237 |
| | | | 382/310 |
| 2005/0154580 A1 | 7/2005 | Horowitz et al. | |
| 2009/0248415 A1* | 10/2009 | Jablokov | G10L 15/30 |
| | | | 704/251 |
| 2010/0161334 A1* | 6/2010 | Kang | G10L 15/10 |
| | | | 704/251 |
| 2010/0169095 A1 | 7/2010 | Asano | |
| 2011/0296374 A1* | 12/2011 | Wu | G06F 17/2715 |
| | | | 717/104 |
| 2012/0101823 A1 | 4/2012 | Weng et al. | |
| 2014/0195226 A1 | 7/2014 | Yun et al. | |
| 2015/0186362 A1* | 7/2015 | Li | G06F 17/2223 |
| | | | 704/3 |
| 2015/0332673 A1 | 11/2015 | Li et al. | |
| 2015/0370787 A1* | 12/2015 | Akbacak | G06F 17/2836 |
| | | | 704/2 |
| 2016/0155436 A1* | 6/2016 | Choi | G10L 15/183 |
| | | | 704/232 |
| 2017/0053646 A1* | 2/2017 | Watanabe | G10L 15/1822 |
| 2017/0068670 A1* | 3/2017 | Orr | G06F 17/30038 |
| 2017/0091169 A1* | 3/2017 | Bellegarda | G06F 17/276 |
| 2017/0186432 A1* | 6/2017 | Aleksic | G10L 15/07 |

FOREIGN PATENT DOCUMENTS

| | | |
|---|---|---|
| JP | 2015-102805 A | 6/2015 |
| KR | 10-1394253 B1 | 5/2014 |
| KR | 10-2014-0092960 A | 7/2014 |
| KR | 10-2014-0112360 A | 9/2014 |
| KR | 10-2015-0066361 A | 6/2015 |

OTHER PUBLICATIONS

Staš, Ján, Daniel Hládek, and Jozef Juhár. "Incorporating grammatical features in the modeling of the slovak language for continuous speech recognition." INTECH Open Access Publisher (2012): 257-276.

Shi, Yongzhe, et al. "RNN language model with word clustering and class-based output layer." EURASIP Journal on Audio, Speech, and Music Processing 2013.1 (2013): 1-7.

European Search Report dated Apr. 7, 2017 in counterpart European Application No. 16201074.8 (11 pages in English).

* cited by examiner

SPEECH RECOGNITION APPARATUS AND METHOD

CROSS-REFERENCE TO RELATED APPLICATIONS

This application claims the benefit under 35 USC 119(a) of Korean Patent Application No. 10-2015-0168967 filed on Nov. 30, 2015, in the Korean Intellectual Property Office, the entire disclosure of which is incorporated herein by reference for all purposes.

BACKGROUND

1. Field

The following description relates to a speech recognition apparatus and method.

2. Description of Related Art

Recent speech recognition technology has drawn much attention unlike the related art of the past. This is because implementation of speech recognition technology allows a more convenient use of Internet information, electronic commerce, and operations in various ubiquitous environments using speech, and satisfies various needs of users such as enabling Internet access, carrying out business affairs, and using other services even when it is difficult to for the users to use their hands.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech recognition apparatus includes a predictor configured to predict a word class of a word following a word sequence that has been previously searched for based on the word sequence that has been previously searched for; and a decoder configured to search for a candidate word corresponding to a speech signal, extend the word sequence that has been previously searched for using the candidate word that has been searched for, and adjust a probability value of the extended word sequence based on the predicted word class.

The word class may be an entity name or a part of speech; and the entity name may be a personal name, a location name, an organization name, a date, a time, a book title, a movie title, a music title, or a TV program name.

The predictor may be further configured to predict a word class of the word following the word sequence that has been previously searched for using a word class prediction model.

The word class prediction model may be constructed in the form of a rule set based on a dictionary and a grammar, or may be constructed through machine learning using either one or both of a named entity recognition scheme and a part-of-speech tagging scheme.

The word class prediction model may be a Recurrent Neural Network (RNN)-based model.

The decoder may be further configured to search for the candidate word using a pronunciation dictionary and a language model constructed in a data structure in a weighted finite-state transducer (WFST) form.

The decoder may be further configured to exclude a candidate word that does not belong to the predicted word class among candidate words that have been searched for from future search targets.

The decoder may be further configured to increase a probability value of a candidate word belonging to the predicted word class among candidate words that have been searched for.

The decoder may be further configured to increase a probability value of a candidate word belonging to the predicted word class and included in a personalized language model among candidate words that have been searched for.

The predictor may be further configured to predict a word class probability distribution of a word following the word sequence that has been previously searched for; and the decoder may be further configured to adjust the probability value of each candidate word by multiplying a probability value of each candidate word by the predicted probability value of the word class to which the candidate word belongs.

In another general aspect, a speech recognition method includes predicting a word class of a word following a word sequence that has been previously searched for based on the word sequence that has been previously searched for; searching for a candidate word corresponding to a speech signal; extending the word sequence that has been previously searched for using the candidate word that has been searched for; and adjusting a probability value of the extended word sequence based on the predicted word class.

The word class may be an entity name or a part of speech; and the entity name may be a personal name, a location name, an organization name, a date, a time, a book title, a movie title, a music title, or a TV program name.

The predicting a word class may include predicting a word class of the word following the word sequence that has been previously searched for using a word class prediction model.

The word class prediction model may be constructed in the form of a rule set based on a dictionary and a grammar, or may be constructed through machine learning using either one or both of a named entity recognition scheme and a part-of-speech tagging scheme.

The word class prediction model may be a Recurrent Neural Network (RNN)-based model.

The searching for a candidate word may include searching for the candidate word using a pronunciation dictionary and a language model constructed in a data structure in a weighted finite-state transducer (WFST) form.

The speech recognition method may further include excluding a candidate word that does not belong to the predicted word class among candidate words that have been searched for from future search targets.

The adjusting a probability value of the extended word sequence may include increasing a probability value of a candidate word belonging to the predicted word class among candidate words that have been searched for.

The adjusting a probability value of the extended word sequence may include increasing a probability value of a candidate word belonging to the predicted word class and included in a personalized language model among candidate words that have been searched for.

The predicting a word class may include predicting a word class probability distribution of a word following the word sequence that has been previously searched for; and the adjusting a probability value of the extended word sequence may include adjusting the probability value of each candidate word by multiplying a probability value of each candidate word by the predicted probability value of the word class to which the candidate word belongs.

In another general aspect, a computer-readable storage medium stores instructions that, when executed by a processor, cause the processor to perform the method described above.

In another general aspect, a word class prediction model generation apparatus includes a training data collector configured to collect training data including a plurality of word sequences and class sequences corresponding to each of the word sequences; and a model generator configured to generate a word class prediction model through learning based on the collected training data.

Each class of the class sequences may be an entity name or a part of speech; and the entity name may be a personal name, a location name, an organization name, date, time, a book title, a movie title, a music title, or a TV program name.

The model generator may be further configured to train a Recurrent Neural Network (RNN) based on the collected training data to generate the word class prediction model.

The model generator may be further configured to train the RNN using a word as an input and a word class of a word following the word as a target.

In another general aspect, a word class prediction model generation method includes collecting training data including a plurality of word sequences and class sequences corresponding to each of the word sequences; and generating a word class prediction model through learning based on the collected training data.

Each class of the class sequences may be an entity name or a part of speech; and the entity name may be a personal name, a location name, an organization name, date, time, a book title, a movie title, a music title, or a TV program name.

The generating a word class prediction model may include training a Recurrent Neural Network (RNN) based on the collected training data to generate the word class prediction model.

The training an RNN may include training the RNN using a word as an input and a word class of a word following the word as a target.

In another general aspect, a speech recognition apparatus includes a predictor configured to predict a word class of a word following a word sequence that has been previously searched for based on the word sequence that has been previously searched for; and a decoder configured to add a word to the word sequence that has been previously searched for based on the predicted word class.

The predictor may be further configured to predict respective probabilities of a plurality of word classes based on the word sequence that has been previously searched for; and the decoder may be further configured to add the word to the word sequence that has been previously searched for based on the predicted probabilities of the plurality of word classes.

The decoder may be further configure to add a word belonging to a word class having a highest probability among the plurality of word classes to the word sequence that has been previously searched for.

The decoder may be further configured to search for a plurality of candidate words corresponding to a speech signal, and determine whether to add one of the candidate words to the word sequence that has been previously searched for based on respective probabilities of the plurality of candidate words and the predicted probabilities of the plurality of predicted word classes.

The decoder may be further configured to search for a candidate word corresponding to a speech signal, and determine whether to add the candidate word to the word sequence that has been previously searched for based on the predicted word class.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
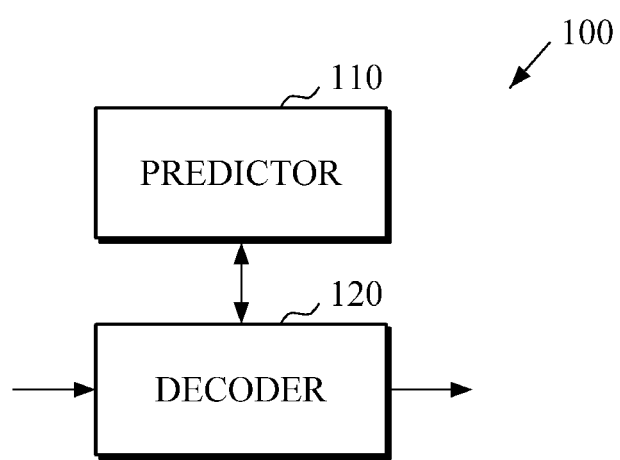
FIG. 1 is a block diagram illustrating an example of a speech recognition apparatus.

FIG. 1 is a block diagram illustrating an example of a speech recognition apparatus. A speech recognition apparatus 100 may be manufactured in the form of a hardware chip, and may be mounted on an electronic device. The electronic device may be, for example, a television (TV), a navigation system, a car electronic device, a smart phone, a tablet PC, a desktop computer, a notebook PC, or a wearable device (for example, a smart watch, a smart glass, a smart headset, or a smart earphone) but is not limited thereto.

Referring to FIG. 1, the speech recognition apparatus 100 may include a predictor 110 and a decoder 120.

The predictor 110 predicts a word class of the next word following a previously detected candidate word sequence based on the previously detected candidate word sequence. The word class is defined for determining whether a word can follow the previously detected candidate word sequence according to context, and indicates a type of word. For example, the word class may be an entity name or a part of speech (for example, a noun, a verb, an adjective, or an adverb).

The entity name may be a proper noun or an unregistered word with an important meaning in a sentence, such as a personal name, a location name, an organization name, a date, a time, a book title, a movie title, a music title, or a TV program name. The entity name may be a phrase of several words, such as "New York" or "United States Patent and Trademark Office".

In one example, using a word class prediction model, the predictor 110 predicts the word class of a word following a candidate word sequence that has been previously searched for. The word class prediction model may be implemented to predict a word class or a word class probability distribution of a word as the next word following the word sequence based on the word sequence. For example, the word class prediction model may be constructed in the form of a rule set based on a dictionary and a grammar and implemented to predict the word class, or may be constructed through machine learning using, for example, a named entity recognition scheme or a part-of-speech tagging scheme and implemented to predict the word class probability distribution. That is, the predictor 110 may predict the word class using the word class prediction model constructed in the form of a rule set, or predict the word class probability distribution using the word class prediction model constructed through machine learning and then predict the word class based on the predicted word class probability distribution.

The machine learning algorithm may be a neural network, a decision tree, a genetic algorithm (GA), genetic programming (GP), a Gaussian process regression, a linear discriminant analysis, a k-nearest neighbors (k-NN) algorithm, a perceptron, a radial basis function network, a support vector machine (SVM), or deep learning (for example, a recurrent neural network (RNN)).

The decoder 120 searches for a candidate word corresponding to a speech signal and extends a candidate word sequence that has been previously searched for using the candidate words that have been searched for. In other words, the decoder 120 adds a word that is highly likely to appear as the next word following the previously recognized candidate word sequence to follow the candidate word sequence based on the speech signal to gradually extend the candidate word sequence.

In one example, the decoder 120 searches for candidate words corresponding to the speech signal using an acoustic model, a pronunciation dictionary, and a language model.

The acoustic model is a model that receives a speech signal and outputs a phoneme (phone or subphone) probability vector. The acoustic model may be constructed in advance using, for example, a Hidden Markov Model (HMM), a Gaussian Mixture Model (GMM), a Recurrent Neural Network (RNN), a Deep Neural Network (DNN), a Bidirectional Long Short Term Model (BLSTM), or a Long Short Term Memory (LSTM).

The pronunciation dictionary is a model in which words for speech recognition are defined and pronunciation symbols for the words are recorded. The pronunciation dictionary may be constructed in advance based on words collected from a corpus or a dictionary.

The language model is a model in which a rule between a word and another word, that is, a kind of grammar, is defined. The language model may be constructed in advance using, for example, an n-gram model, a Recurrent Neural Network (RNN), a Deep Neural Network (DNN), a Bidirectional Long Short Term Model (BLSTM), or a Long Short Term Memory (LSTM), to determine the probability of the word sequence by referring to a list of words constituting the word sequence.

In one example, the pronunciation dictionary and the language model are constructed in a data structure in a weighted finite-state transducer (WFST) form. The data structure in the weighted finite-state transducer (WFST) form may be an abbreviated data structure including all possible word sequences for a phoneme sequence. If the pronunciation dictionary and the language model are constructed in a data structure in the WFST form, the decoder 120 searches for a possible word sequence corresponding to the speech signal based on the data structure in the WFST form.

The decoder 120 calculates the probability value of the extended candidate word sequence. For example, the decoder 120 calculates the probability value of the candidate word that has been searched for using the acoustic model and the language model, and calculates the probability value of the extended candidate word sequence based on the calculated probability value of the candidate word.

Further, the decoder 120 adjusts a probability value of the extended candidate word sequence based on the word class predicted by the predictor 110.

In one example, the decoder 120 adjusts the probability value of the extended candidate word sequence by increasing the probability value of the candidate word belonging to the word class predicted by the predictor 110 among the candidate words that have been searched for. For example, when the predictor 110 predicts a location name as a word class of a word following the candidate word sequence that has been previously searched for and the decoder 120 searches for "A" related to a personal name and "B" and "C" related to the location name as candidate words corresponding to the speech signal, the decoder 120 increases probability values of the candidate words "B" and "C" by applying a large weight to the candidate words "B" and "C" belonging to the location name among the candidate words "A", "B", and "C" that have been searched for. A scheme of applying a weight may be a scheme of adjusting a weight of the language model and/or the acoustic model, but the scheme is not limited thereto and the weight may be applied in a variety of schemes.

In another example, the decoder 120 adjusts the probability value of the extended candidate word sequence by increasing the probability value of a candidate word belonging to the word class predicted by the predictor 110 and included in a personalized language model among the candidate words that have been searched for. For example, if the predictor 110 predicts a location name as a word class of a word following the candidate word sequence that has been previously searched for, the decoder 120 searches for "A" related to the personal name and "B" and "C" related to the location name as candidate words corresponding to the speech signal, and the location name "C" as well as location names "D" and "E" are included in the personalized language model, the decoder 120 increases the probability value of the candidate word "C" by applying a large weight to the candidate word "C" belonging to the location name and included in the personalized language model among the candidate words "A", "B", and "C" that have been searched for.

The personalized language model may be constructed in advance using, for example, a n-gram, a Recurrent Neural Network (RNN), a Deep Neural Network (DNN), a Bidirectional Long Short Term Model (BLSTM), or a Long Short Term Memory (LSTM) based on a personalized corpus.

In another example, the decoder 120 adjust the probability value of the extended candidate word sequence by reflecting the probability value of each predicted word class in the probability value of the candidate word belonging to the class. For example, when the predictor 110 predicts 0.6 for a location name and 0.4 for a personal name as class probabilities of words following the candidate word sequence that has been previously searched for and the decoder 120 searches for "A" related to the personal name and "B" and "C" related to the location name as candidate words corresponding to the speech signal, the decoder 120 adjusts the probability values of the candidate words "A", "B", and "C" by multiplying the probability value of the candidate word "A" by 0.4 and multiplying the probability values of the candidate words "B" and "C" by 0.6.

The decoder 120 may reduce the future search range by pruning words that do not belong to the word class predicted by the predictor 110 among the candidate words that have been searched for. In other words, the decoder 120 may remove from future search targets words that do not belong to the word class predicted by the predictor 110 among the candidate words that have been searched for.

Further, the decoder 120 selects the candidate word sequence having a maximum probability value based on a result of the adjustment of the probability value of the candidate word sequence and outputs the selected candidate word sequence as a speech recognition result.

Further, when the speech recognition for the input speech signal is not completed, the decoder 120 may select a predetermined number of candidate word sequences for which the probability value is great from the extended/generated candidate word sequences and remove other candidate word sequences from a future search range.

Figure 2:
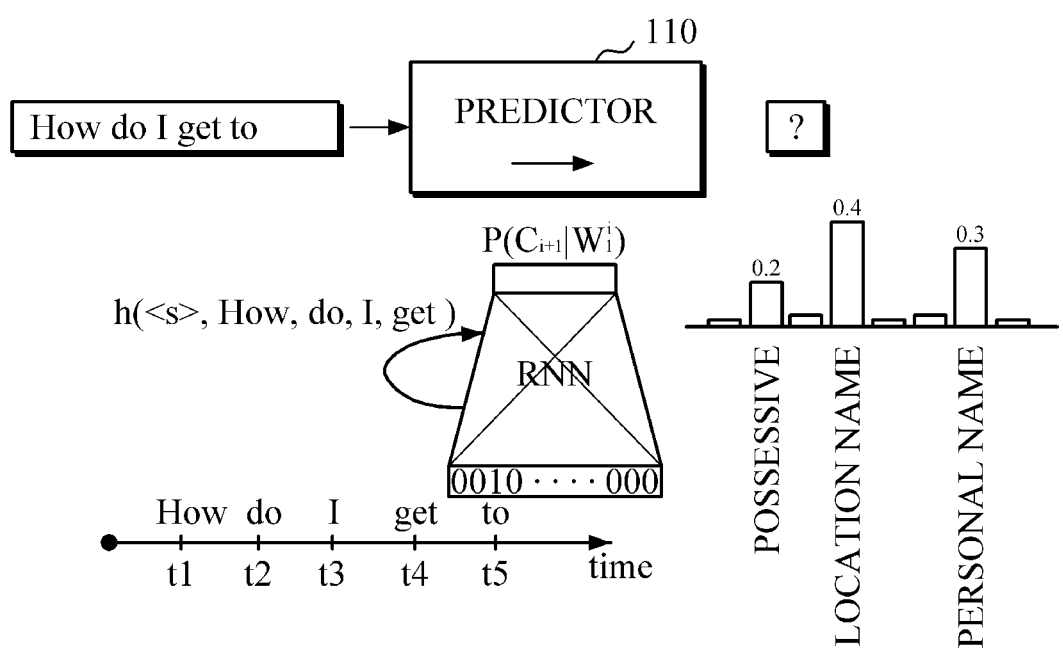
FIG. 2 is a diagram illustrating an example of a process of predicting a word class probability distribution of a word following a word sequence.

FIG. 2 is a diagram illustrating an example of a process of predicting a word class probability distribution of a word following the word sequence. In this example, a word class prediction model is assumed to be a RNN-based model implemented to predict the word class probability distribution.

The predictor 110 predicts a word class probability distribution of the next word following a word sequence "How do I get to" using a previously constructed word class prediction model. That is, when the predictor 110 receives "to" at time t5, the predictor 110 predicts the word class probability distribution of the next word following the candidate word sequence "How do you get to" using the previously constructed word class prediction model. In the illustrated example, the word class probability of the next word following "How do you get to" is 0.2 for a possessive, 0.4 for a location name, and 0.3 for a personal name. In this example, the probability of 0.4 for the location name is the highest probability.

Figure 3:
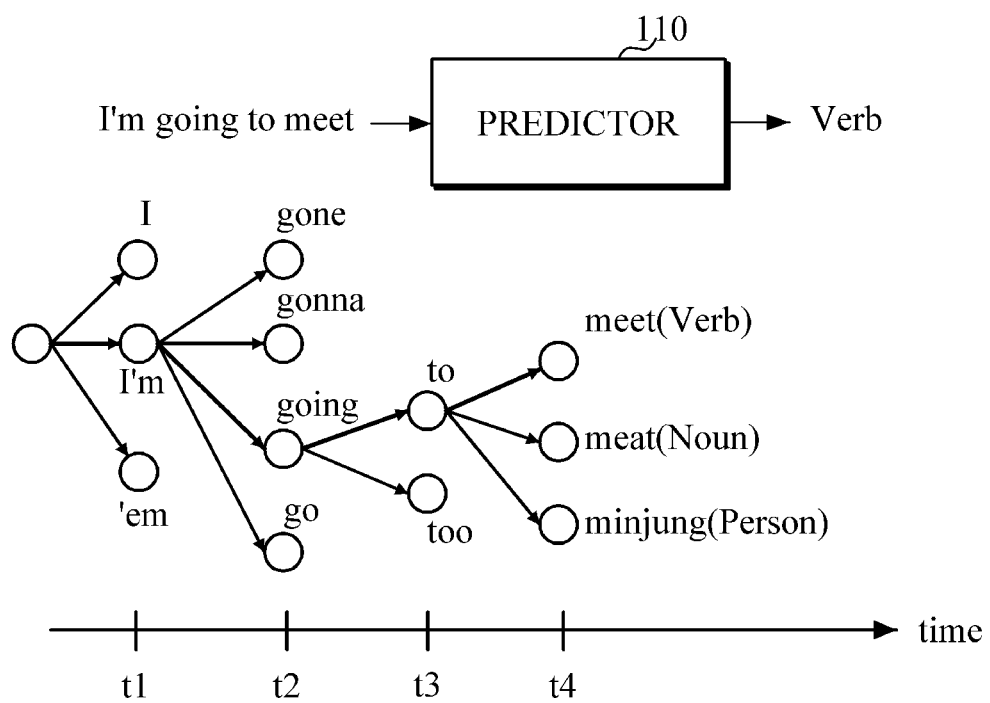
FIG. 3 is a view illustrating an example of a process of adjusting a probability value of a candidate word sequence based on a part of speech.

FIG. 3 is a diagram illustrating an example of a process of adjusting a probability value of the candidate word sequence based on a part of speech and illustrates an example of a snapshot of a specific point in time (t4) in a speech recognition process. In this example, it is assumed that the decoder 120 has generated a candidate word sequence "I'm going to" corresponding to a speech signal over time from t1 to t3 as illustrated.

In the illustrated example, since a verb is highly likely to appear as the next word following "I'm going to" according to context, the predictor 110 predicts a verb as a word class of a word following "I'm going to" based on the candidate word sequence "I'm going to". The predictor 110 may use a word class prediction model that has previously been constructed to predict the word class of the word following the word sequence based on the word sequence.

The decoder 120 searches for candidate words "meet", "meat", and "minjung" to appear as the next word following the candidate word sequence "I'm going to" based on an acoustic model, a pronunciation dictionary, and a language model, and extends the candidate word sequence "I'm going to" to generate extended candidate word sequences "I'm going to meet", "I'm going to meat", and "I'm going to minjung" at a point in time t4.

Then, the decoder 120 increases the probability value of "meet" belonging to a verb word class among the candidate words "meet", "meat", and "minjung" to increase the probability value of "I'm going to meet".

Figure 4:
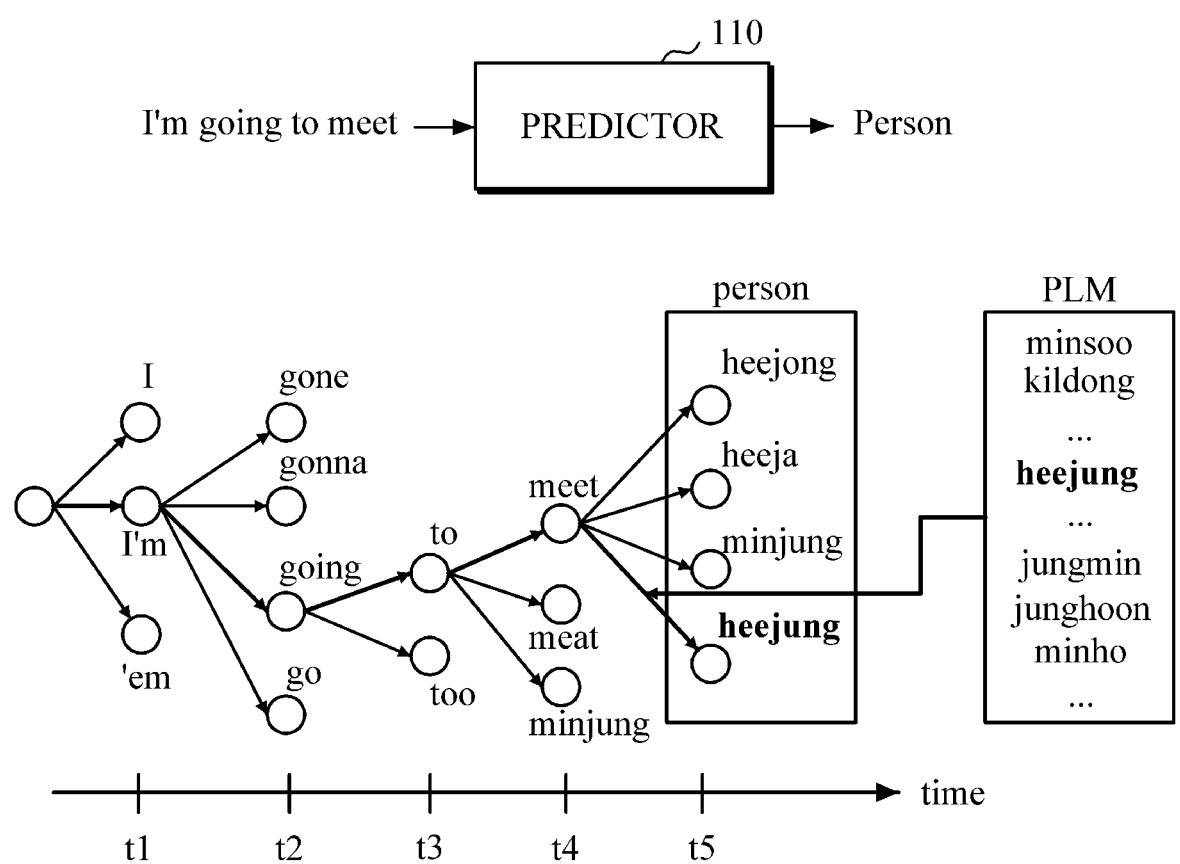
FIG. 4 is a diagram illustrating an example of a process of adjusting a probability value of a candidate word sequence by applying personalized information.

FIG. 4 is a diagram illustrating an example of a process of adjusting the probability value of the candidate word sequence by applying personalized information, and illustrates an example of a snapshot of a specific point in time (t5) in the speech recognition process. In this example, it is assumed that the decoder 120 has generated the candidate word sequence "I'm going to meet" corresponding to the speech signal over time from t1 to t4 as illustrated.

In the illustrated example, since a personal name is highly likely to appear as the next word after "I'm going to meet" according to context, the predictor 110 predicts the personal name as a word class of a word following "I'm going to meet" based on the candidate word sequence "I'm going to meet". The predictor 110 may use a word class prediction model that has previously been constructed to predict the word class of the word following the word sequence based on the word sequence.

The decoder 120 searches for candidate words "heejong", "heeja", "minjung", and "heejung" to appear as the next word following the candidate word sequence "I'm going to meet" based on an acoustic model, a pronunciation dictionary, and a language model, and extends the candidate word sequence "I'm going to meet" to generate extended candidate word sequences "I'm going to meet heejong", "I'm going to meet heeja", "I'm going to meet minjung", and "I'm going to meet heejung" at a point in time t5.

Then, the decoder 120 searches a personalized language model (PLM) related to a personal name, increases the probability value of "heejung" found in the personalized language model (PLM) among the candidate words "heejong", "heeja", "minjung" and "heejung", and increases the probability value of "I'm going to meet heejung".

Figure 5:
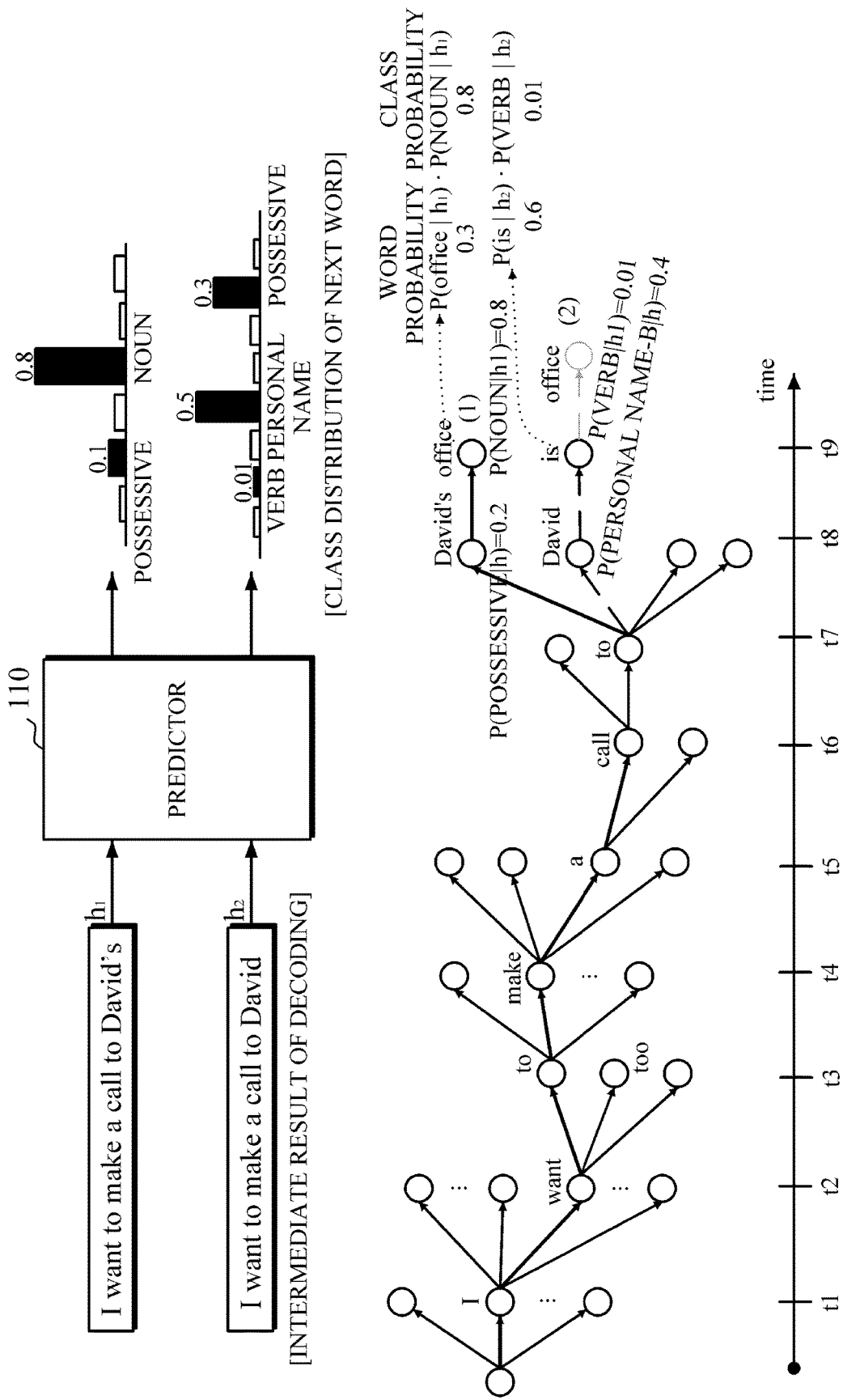
FIG. 5 is a diagram illustrating an example of a process of adjusting a probability value of a candidate word sequence based on a predicted word class probability distribution.

FIG. 5 is a diagram illustrating an example of a process of adjusting the probability value of the candidate word sequence based on the predicted word class probability distribution, and illustrates an example of a snapshot of a specific point in time (t9) in the speech recognition process. In this example, it is assumed that the decoder 120 has generates candidate word sequences "I want to make a call to David's" and "I want to make a call to David" corresponding to a speech signal over time from t1 to t8 as illustrated in FIG. 5.

The predictor 110 predicts a word class probability distribution of the word following the candidate word sequence "I want to make a call to David's" based on the candidate word sequence "I want to make a call to David's" and predicts a word class probability distribution of a word following the candidate word sequence "I want to make a call to David" based on the candidate word sequence "I want to make a call to David." In the illustrated example, the predictor 110 predicts 0.8 for a noun and 0.1 for a possessive as the word class probabilities of words as the next word following the candidate word sequence "I want to make a call to David's," and predicts 0.01 for a verb, 0.5 for a personal name, and 0.3 for a possessive as the word class probabilities of words as the next word following the candidate word sequence "I want to make a call to David".

Then, the decoder 120 searches for a candidate word "office" (probability value 0.3) to appear as the next word following the candidate word sequence "I want to make a call to David's" and a candidate word "is" (probability value 0.6) to appear as the next word following the candidate word sequence "I want to make a call to David" based on the acoustic model, the pronunciation dictionary, and the language model at a point in time t9 and generates extended candidate word sequences "I want to make a call to David's office" and "I want to make a call to David is" by extending the respective candidate word sequences using the candidate words that have been searched for.

Then, the decoder 120 multiplies the probability value 0.3 of "office" by the noun class probability value 0.8 to adjust the probability value of the extended candidate word sequence "I want to make a call to David's office" to 0.24, and multiplies the probability value 0.6 of "is" by the verb class probability value 0.01 to adjust the probability value of the extended candidate word sequence "I want to make a call to David is to 0.006.

Figure 6:
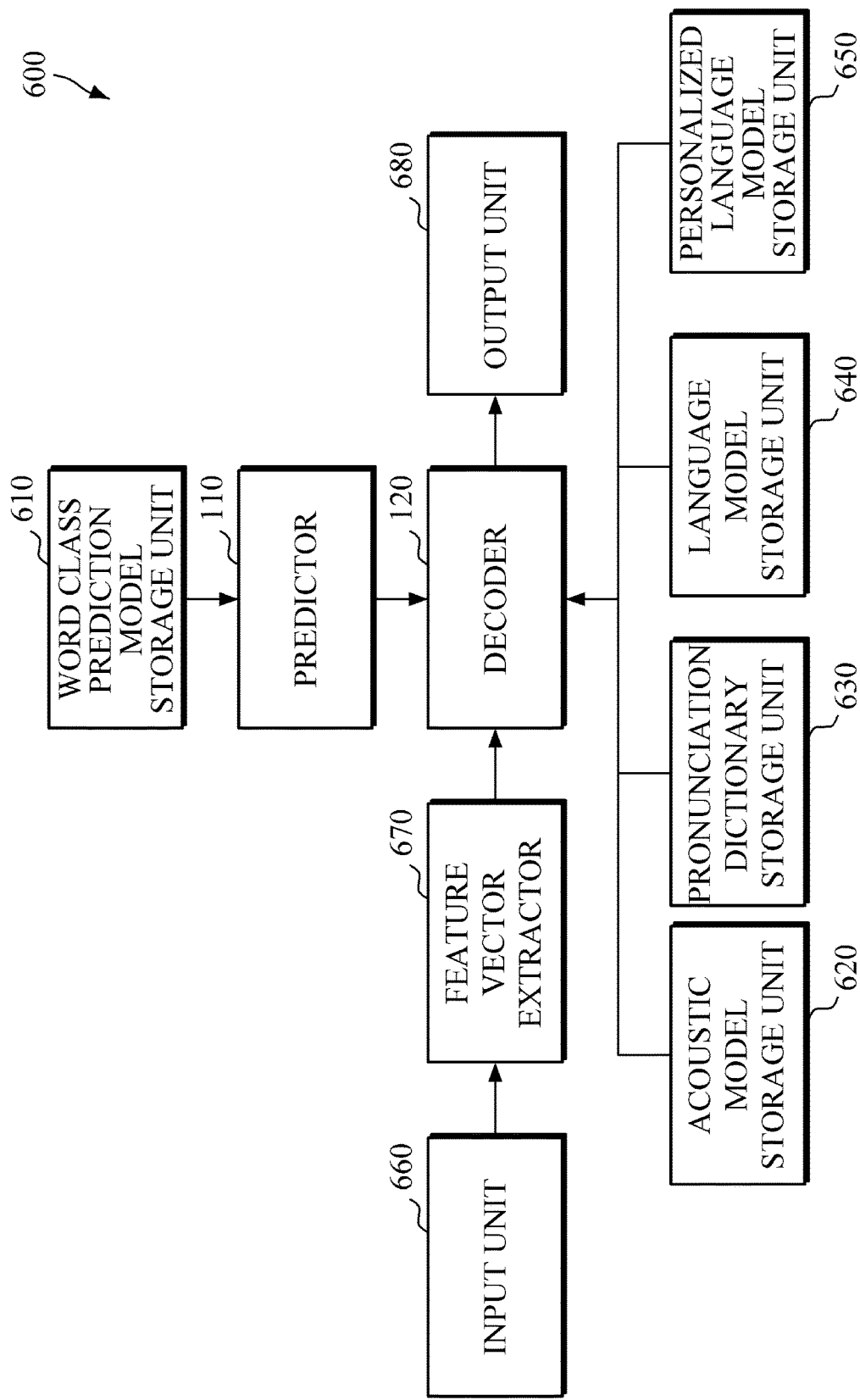
FIG. 6 is a block diagram illustrating another example of a speech recognition apparatus.

FIG. 6 is a block diagram illustrating another example of a speech recognition apparatus.

Referring to FIG. 6, compared to the speech recognition apparatus 100 in FIG. 1, a speech recognition apparatus 600 in FIG. 6 further includes a word class prediction model storage unit 610, an acoustic model storage unit 620, a pronunciation dictionary storage unit 630, a language model storage unit 640, a personalized language model storage unit 650, an input unit 660, a feature vector extractor 670, and an output unit 680.

The word class prediction model storage unit 610 stores the word class prediction model, the acoustic model storage unit 620 stores the acoustic model, the pronunciation dictionary storage unit 630 stores the pronunciation dictionary, the language model storage unit 640 stores the language model, and the personalized language model storage unit 650 stores the personalized language model.

In one example, the word class prediction model storage unit 610, the acoustic model storage unit 620, the pronunciation dictionary storage unit 630, the language model storage unit 640, and the personalized language model storage unit 650 include as a storage medium any one or any combination of any two or more of a flash memory, a hard disk, a MultiMediaCard (MMC), an MMCmicro, a memory card (for example, an SD memory card or an XD memory card), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Although the storage units 610 to 650 are shown as separate components in the illustrated example, the storage units 610 to 650 may be integrated into one storage unit.

The input unit 660 receives a user speech signal. To accomplish this, the input unit 660 may include, for example, a microphone.

The feature vector extractor 670 divides the input speech signal into unit frames, and extracts a feature vector corresponding to a section of the divided input speech signal.

In one example, the feature vector extractor 670 detects a speech section from the input speech signal through voice activity detection (VAD), and extracts a feature of the speech to obtain information suitable for speech recognition from the speech signal in the detected speech section. In one example, the feature vector extractor 670 calculates a frequency characteristic of the speech signal for each unit frame to extract the feature vector included in the speech signal. To accomplish this, the feature vector extractor 670 may include an analog-to-digital (ND) converter that converts an analog speech signal into a digital speech signal, and may divide the digital speech signal into unit frames of about 10 ms and process the signal.

The feature vector extractor 670 may extract the feature vector using a mel-frequency cepstrum coefficients (MFCC) feature extraction scheme. In the mel-frequency cepstrum coefficients (MFCC) feature extraction scheme, mel-cepstrum coefficients, log energy, and a feature vector in the form of a combination of first- and second-order differentiations may be used.

Further, the feature vector extractor 670 may use a method such as linear predictive coding (LPC), LPC derived cepstrum, perceptive linear prediction (PLP), audio model feature extraction, or filter bank to extract the feature of the speech signal in a unit frame region.

The output unit 680 outputs a speech recognition result. In one example, the output unit 680 outputs a speech recognition result in an audible manner or a visual manner. To accomplish this, the output unit 680 may include, for example, a speaker or a display. The display may include, for example, a liquid crystal display, a thin-film transistor liquid crystal display, an organic light-emitting diode, a flexible display, a three-dimensional display (3D display), or a spectacle type display (for example, a head-mounted display (HMD), a face-mounted display (FMD), an eye-mounted display (EMD), or an eye glass display (EGD)).

Figure 7:
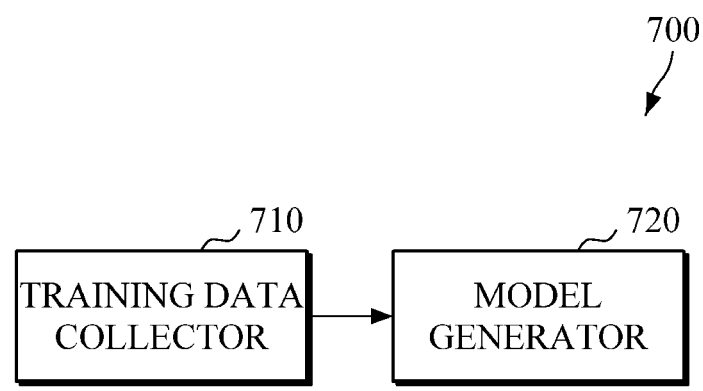
FIG. 7 is a block diagram illustrating an example of a word class prediction model generation apparatus.

FIG. 7 is a block diagram illustrating an example of a word class prediction model generation apparatus.

Referring to FIG. 7, the word class prediction model generation apparatus 700 includes a training data collector 710 and a model generator 720.

The training data collector 710 collects training data including a plurality of word sequences and class sequences corresponding to the respective word sequences.

A method by which the training data collector 710 collects the training data is not particularly limited. That is, the training data collector 710 can simply receive and collect a plurality of word sequences and class sequences corresponding to each of the word sequences from an external device, or can receive a plurality of word sequences from an external device and generate class sequences corresponding to each of the word sequences through a named entity recognition scheme or a part-of-speech tagging scheme using a dictionary or other resource.

The model generator 720 generates the word class prediction model through machine learning based on the collected training data. The machine learning algorithm may be a neural network, a decision tree, a genetic algorithm (GA), genetic programming (GP), a Gaussian process regression, a linear discriminant analysis, a k-nearest neighbors (k-NN) algorithm, a perceptron, a radial basis function network, a support vector machine (SVM), or deep learning (for example, a recurrent neural network (RNN)).

A method of generating a word class prediction model will be described in detail with reference to FIG. 8.

Figure 8:
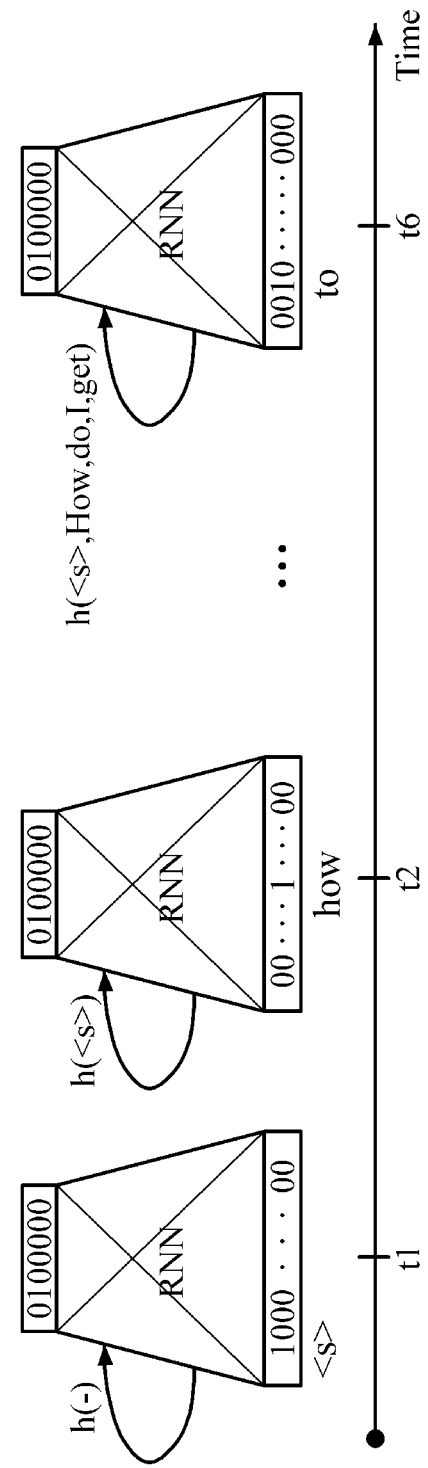
FIG. 8 is a diagram illustrating an example of a method of generating a word class prediction model.

FIG. 8 is a diagram illustrating an example of a method of generating a word class prediction model. In this example, the word class prediction model is assumed to be an RNN-based model that is effective for sequence pattern learning. The model generator 720 trains an RNN with a word and a word class of the next word as an input and a target of the RNN at each point in time. In this example, the input and the target may be expressed as one-hot vectors. For example, the input is expressed as a one-hot vector having a size of a word dictionary for which a location value of the word is 1 and other values are 0, and the target is expressed as a one-hot vector having a size of a class to be handled for which a location value of the class is 1 and other values are 0.

Referring to FIG. 8, the model generator 720 trains the RNN with a word "<s>" indicating the start of the word sequence as an input and a word class "adverb" of a first word as a target at a point in time t1.

Then, the model generator 720 trains the RNN with a first word "how" as an input and a word class "verb root" of a second word as a target at a point in time t2.

The model generator 720 trains the RNN in this way at each point in time between a point in time t3 to a point in time t5, and trains the RNN with a fifth word "to" as an input and a word class "location name" of a sixth word as a target at a point in time t6.

The model generator 720 learns a plurality of training data items in this way, and generates he word class prediction model.

Figure 9:
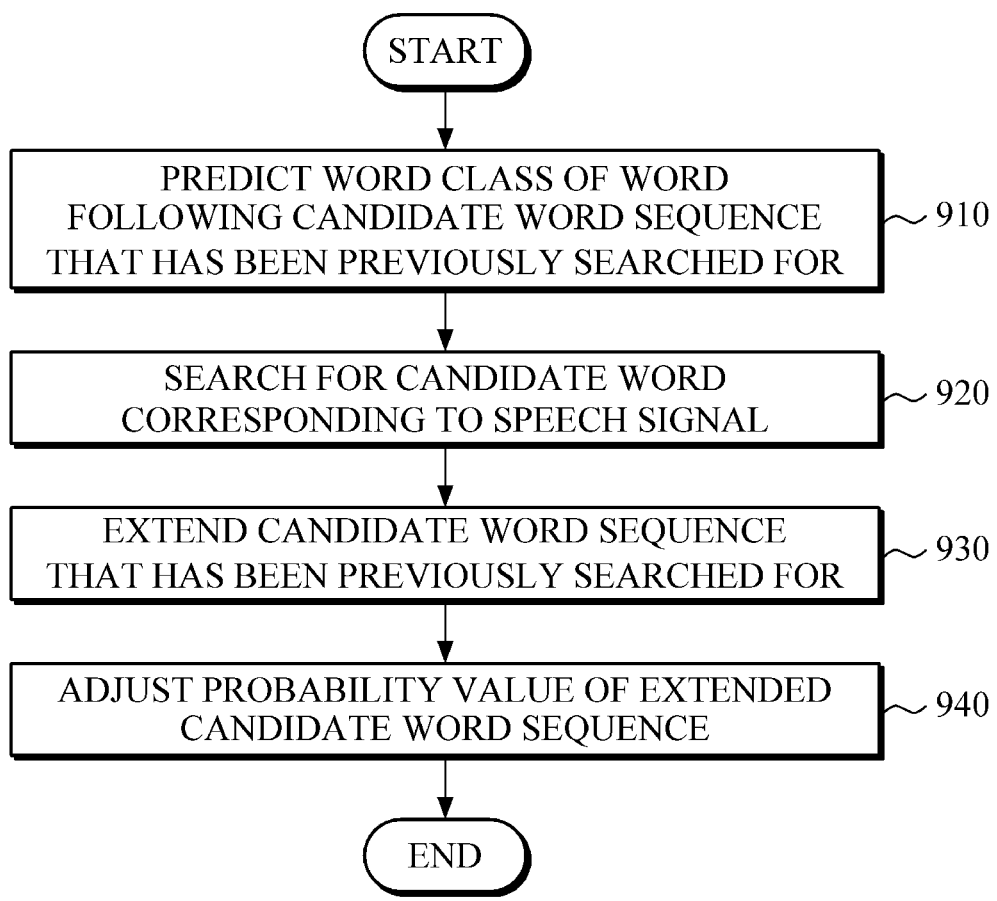
FIG. 9 is a flowchart illustrating an example of a speech recognition method.

FIG. 9 is a flowchart illustrating an example of a speech recognition method.

Referring to FIGS. 1 and 9, the speech recognition apparatus 100 predicts a word class of a word following a candidate word sequence that has been previously searched for based on the candidate word sequence that has been previously searched for (910). For example, the speech recognition apparatus 100 predicts the word class of a word following a candidate word sequence that has been previously searched for using the word class prediction model. The word class prediction model may be implemented to predict a word class or a word class probability distribution of a word following the word sequence based on the word sequence. For example, the word class prediction model may be constructed in the form of a rule set based on a dictionary and a grammar and implemented to predict the word class, or may be constructed through machine learning using, for example, a named entity recognition scheme or a part-of-speech tagging scheme and implemented to predict the word class probability distribution. That is, the speech recognition apparatus 100 may predict the word class using the word class prediction model constructed in the form of a rule set, or may predict the word class probability distribution using the word class prediction model constructed through machine learning, and then predict the word class based on the predicted word class probability distribution.

The speech recognition apparatus 100 searches for a candidate word corresponding to a speech signal (920). For example, the speech recognition apparatus 100 searches for a candidate word corresponding to the speech signal using an acoustic model, a pronunciation dictionary, and a language model. In this example, the pronunciation dictionary and the language model may be constructed in a data structure in a weighted finite-state transducer (WFST) form. In this example, the speech recognition apparatus 100 searches for a possible word sequence corresponding to the speech signal based on the WFST.

The speech recognition apparatus 100 extends the candidate word sequence that has been previously searched for using the candidate words that have been searched for (930). For example, the speech recognition apparatus 100 adds a word that is highly likely to appear as the next word following the candidate word sequence, that is, the candidate word that has been searched for, to follow the candidate word sequence to gradually extend the candidate word sequence.

The speech recognition apparatus 100 adjusts the probability value of the extended candidate word sequence based on the predicted word class (940).

In one example, the speech recognition apparatus 100 adjusts the probability value of the extended candidate word sequence by increasing the probability value of the candidate word belonging to the predicted word class among the candidate words that have been searched for.

In another example, the speech recognition apparatus 100 adjusts the probability value of the extended candidate word sequence by increasing the probability value of the candidate word belonging to the predicted word class and included in a personalized language model among the candidate words that have been searched for.

In another example, the speech recognition apparatus 100 reflects the probability value of each predicted word class in the probability value of the candidate word belonging to the class to adjust the probability value of the extended candidate word sequence.

Figure 10:
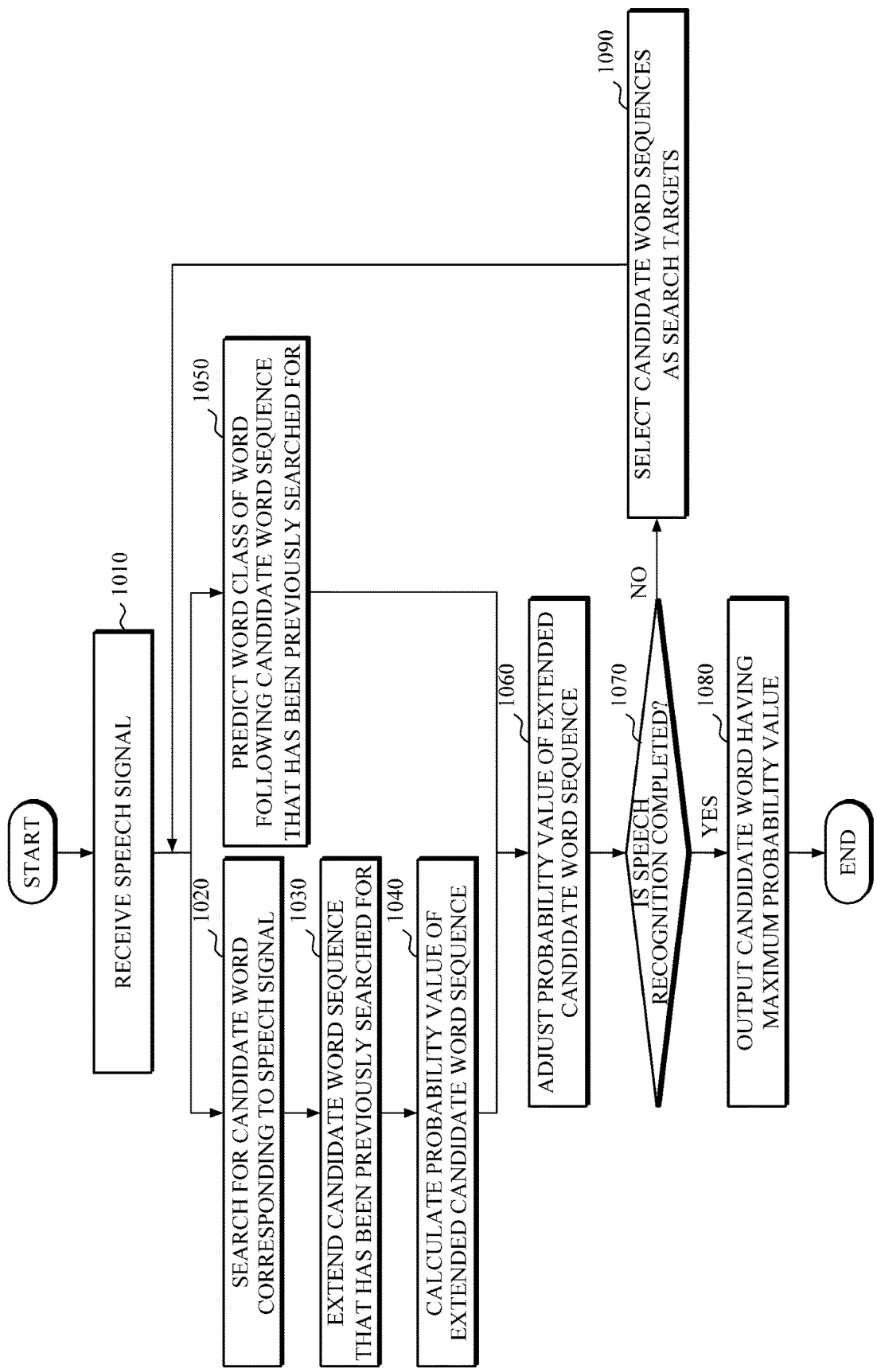
FIG. 10 is a flowchart illustrating another example of a speech recognition method.

FIG. 10 is a flowchart illustrating another example of a speech recognition method.

Referring to FIGS. 1 and 10, the speech recognition apparatus 100 receives a speech signal (1010) and searches for a candidate word corresponding to the speech signal (1020). For example, the speech recognition apparatus 100 searches for a candidate word corresponding to the speech signal using an acoustic model, a pronunciation dictionary, and a language model. In this example, the pronunciation dictionary and the language model may be constructed in a data structure in a weighted finite-state transducer (WFST) form. In this example, the speech recognition apparatus 100 searches for a possible word sequence corresponding to the speech signal based on WFST.

The speech recognition apparatus 100 extends the candidate word sequence that has been previously searched for using the candidate words that have been searched for (1030). For example, the speech recognition apparatus 100 adds a word that is highly likely to appear as the next word of a previously recognized candidate word sequence to follow the candidate word sequence to gradually extend the candidate word sequence.

The speech recognition apparatus 100 calculates the probability value of the extended candidate word sequence (1040). For example, the speech recognition apparatus 100 calculates the probability value of the extended candidate word sequence using an acoustic model and a language model.

The speech recognition apparatus 100 predicts a word class of a word following a candidate word sequence that has been previously searched for, based on the candidate word sequence that has been previously searched for (1050). For example, the speech recognition apparatus 100 predicts a word class of a word following the candidate word sequence that has been previously searched for using the word class prediction model. In this example, the word class prediction model may be implemented to predict a word class or a word class probability distribution of a word following the word sequence based on the word sequence. For example, the word class prediction model may be constructed in the form of a rule set based on a dictionary and a grammar and implemented to predict the word class, or may be constructed through machine learning using, for example, a named entity recognition scheme or a part-of-speech tagging scheme and implemented to predict the word class probability distribution. That is, the speech recognition apparatus 100 may predict the word class using the word class prediction model constructed in the form of a rule set, or may predict the word class probability distribution using the word class prediction model constructed through machine learning, and then predict the word class based on the predicted word class probability distribution.

The speech recognition apparatus 100 adjusts the probability value of the extended candidate word sequence based on the predicted word class (1060).

In one example, the speech recognition apparatus 100 adjusts the probability value of the extended candidate word sequence by increasing the probability value of the candidate word belonging to the predicted word class among the candidate words that have been searched for.

In another example, the speech recognition apparatus 100 adjusts the probability value of the extended candidate word sequence by increasing the probability value of the candidate word belonging to the predicted word class and included in the personalized language model among the candidate words that have been searched for.

In another example, the speech recognition apparatus 100 adjusts the probability value of the extended candidate word sequence by reflecting the probability value of each predicted word class in the probability value of the candidate word belonging to the class.

The speech recognition apparatus 100 determines whether the speech recognition is completed (1070), and outputs the candidate word having a maximum probability value as a speech recognition result if the speech recognition is completed (1080).

If the speech recognition is not completed, the speech recognition apparatus 100 selects a predetermined number of candidate word sequences of which the probability value is great and removes other candidate word sequences from a future search range (1090).

The speech recognition apparatus 100 may reduce the future search range by pruning words that do not belong to the predicted word class among the candidate words that have been searched for. In other words, the speech recognition apparatus 100 may remove from future search targets words that do not belong to the predicted word class among the candidate words that have been searched for.

Figure 11:
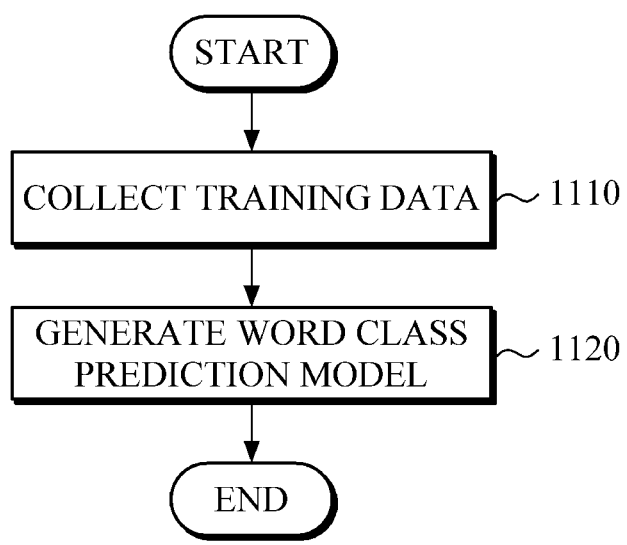
FIG. 11 is a flowchart illustrating an example of a method of generating a word class prediction model.

FIG. 11 is a flowchart illustrating an example of a method of generating a word class prediction model.

Referring to FIGS. 7 and 11, the word class prediction model generation apparatus 700 collects training data including a plurality of word sequences and class sequences corresponding to the respective word sequences (1110).

The word class prediction model generation apparatus 700 generates the word class prediction model through machine learning based on the collected training data (1120). In this example, the machine learning algorithm may be a neural network, a decision tree, a genetic algorithm (GA), genetic programming (GP), a Gaussian process regression, a linear discriminant analysis, a k-nearest neighbors (k-NN) algorithm, a perceptron, a radial basis function network, a support vector machine (SVM), or deep learning (for example, a recurrent neural network (RNN)). Since a specific method by which the word class prediction model generation apparatus 700 generates the word class prediction model is the same as described above with reference to FIG. 8, a detailed description thereof will be omitted with respect to FIG. 11.

The predictor 110 in FIGS. 1-6, the decoder 120 in FIGS. 1 and 6, the word class prediction model storage unit 610, the acoustic model storage unit 620, the pronunciation dictionary storage unit 630, the language model storage unit 640, the personalized language model storage unit 650, the input unit 660, the feature vector extractor 670, and the output unit 680 in FIG. 6, and the training data collector 710 and the model generator 720 in FIG. 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 9-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that that various modifications may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition apparatus comprising:
   one or more processors configured to:
      generate a word sequence based on word class probability distributions and word probabilities of words of the word sequence,
      generate, based on the word sequence, a word class probability distribution for word classes of a word following the word sequence,
      determine word probabilities with respect to candidate words, corresponding to the word following the word sequence, as results of a speech recognition model configured to predict the word following the word sequence,
      adjust the word probabilities with respect to the candidate words based on the word class probability distribution and a personalized language model, and
      output, as a speech recognition result, an extended word sequence including the word sequence and a candidate word having a highest adjusted probability value among the adjusted probability values.

2. The speech recognition apparatus of claim 1, wherein:
   the word classes include either one or both of an entity name and a part of speech; and
   the entity name is any one or any combination of any two or more of a personal name, a location name, an organization name, a date, a time, a book title, a movie title, a music title, and a TV program name.

3. The speech recognition apparatus of claim 1, wherein the one or more processors are configured to generate the word class probability distribution using a word class prediction model.

4. The speech recognition apparatus of claim 3, wherein the word class prediction model is either one or both of:
   constructed in the form of a rule set based on a dictionary and a grammar; and
   constructed through machine learning using either one or both of a named entity recognition scheme and a part-of-speech tagging scheme.

5. The speech recognition apparatus of claim 3, wherein the word class prediction model is a Recurrent Neural Network (RNN)-based model.

6. The speech recognition apparatus of claim 1, wherein, for the determining of the word probabilities with respect to the candidate words, the one or more processors are configured to determine the word probabilities with respect to the candidate words using a pronunciation dictionary and a language model constructed in a data structure in a weighted finite-state transducer (WFST) form as the speech recognition model.

7. The speech recognition apparatus of claim 1, wherein the one or more processors are configured to perform the generating and determining with respect to at least one extended word sequence, including the extended word sequence, with the at least one extended word sequence selectively excluding one or more of the candidate words determined to not belong to at least one word class determined based on the word class probability distribution, or with the at least one extended word sequence selectively excluding one or more extended word sequences that include the one or more candidate words.

8. The speech recognition apparatus of claim 1, wherein:
for the adjusting of the word probability, the one or more processors are configured to adjust the word probability by multiplying the word probability by the class probability.

9. The speech recognition apparatus of claim 1, wherein the word sequence is a search result of speech recognition for the word sequence prior to the generation of the word class probability distribution and the determination of the probabilities with respect to the candidate words.

10. The speech recognition apparatus of claim 1, wherein the determined probabilities with respect to the candidate words are probabilities of the candidate words or probabilities of extended word sequences that include the word sequence and respectively the candidate words.

11. A processor-implemented speech recognition method comprising:
generating a word sequence based on word class probability distributions and word probabilities of words of the word sequence,
predicting, based on the word sequence, a word class of a word following the word sequence and a word class probability of the word class;
determining, based on a speech signal, a candidate word corresponding to the word following the word sequence and a word probability of the candidate word;
determining whether the candidate word belongs to the word class,
adjusting the word probability of the candidate word based on the class probability, in response to determining that the candidate word belongs to the word class, and
outputting, as a speech recognition result, an extended word sequence including the word sequence and the determined candidate word,
wherein the adjusting the probability value of the extended word sequence comprises increasing the probability value of the candidate word, in response to the candidate word belonging to the word class and being included in a personalized language model.

12. A speech recognition apparatus comprising:
one or more processors configured to:
predict, based on a word sequence, a word class of a word following a word sequence and a word class probability of the word class;
extending, based on the word class, the word sequence to include a candidate word corresponding to the word class, in response to the candidate word belonging to the word class;
predict, based on the extended word sequence, another word class of a word following the extended word sequence and another word class probability of the other word class; and
extending, based on the other word class, the extended word sequence to include another candidate word corresponding to the other word class, in response to the other candidate word belonging to the other word class.

13. The speech recognition apparatus of claim 12, wherein the one or more processors are further configured to:
predict respective word class probabilities of a plurality of word classes based on the word sequence; and
add the candidate word to the word sequence based on the word class probabilities,
wherein the word class is one of the plurality of word classes and the word class probability is one of the plurality of word class probabilities.

14. The speech recognition apparatus of claim 13, wherein:
the candidate word belongs to the word class; and
the adding of the candidate word comprised adding the candidate word to the word sequence in response to the word class having a highest probability among the plurality of word classes.

15. The speech recognition apparatus of claim 13, wherein the one or more processors are further configured to:
determine a plurality of candidate words that correspond to a speech signal; and
determine whether to add one of the candidate words to the word sequence based on respective probabilities of the plurality of candidate words and the probabilities of the plurality of word classes,
wherein the candidate word is one of the plurality of candidate words.

16. The speech recognition apparatus of claim 12, wherein the one or more processors are further configured to:
determine the candidate word based on a speech signal; and
determine whether to add the candidate word to the word sequence based on the word class.

17. A processor-implemented speech recognition method comprising:
generate a word sequence based on word class probability distributions and word probabilities of words of the word sequence,
predicting, based on the word sequence, a word class or a word class probability distribution for word classes of a word following the word sequence;
determining, based on a speech signal, word probabilities with respect to candidate words corresponding to the word following the word sequence using a speech recognition model;
determining which of the candidate words belong to the word class or a select word class determined based on the word class probability distribution;
selectively, based on a result of the determining of which candidate words belong to the word class or the select word class, adjusting the word probabilities with respect to the candidate words; and output, as a speech recognition result, an extended word sequence including the word sequence and a candidate word selected based on the selectively adjusted probabilities with respect to the candidate words.

18. The speech recognition method of claim 17, wherein:
the word class is either one or both of an entity name and a part of speech; and
the entity name is any one or any combination of any two or more of a personal name, a location name, an organization name, a date, a time, a book title, a movie title, a music title, and a TV program name.

19. The speech recognition method of claim 17, wherein the predicting the word class comprises predicting the word class using a word class prediction model.

20. The speech recognition method of claim 19, wherein the word class prediction model is either one or both of:
constructed in the form of a rule set based on a dictionary and a grammar; and
constructed through machine learning using either one or both of a named entity recognition scheme and a part-of-speech tagging scheme.

21. The speech recognition method of claim 19, wherein the word class prediction model is a Recurrent Neural Network (RNN)-based model.

22. The speech recognition method of claim 17, wherein the determining the candidate word comprises searching for the candidate word using a pronunciation dictionary and a language model constructed in a data structure in a weighted finite-state transducer (WFST) form.

23. The speech recognition method of claim 17, further comprising excluding the candidate word as a candidate word for a future target, in response to the candidate word not belonging to the word class.

24. The speech recognition method of claim 17, wherein:
the determining the word class comprises predicting a word class probability distribution of the word following the word sequence; and
the adjusting the probability value of the extended word sequence comprises adjusting the probability value of the candidate word by multiplying a probability value of the candidate word by the probability value of the word class, wherein the candidate word belongs to the word class.

25. A non-transitory computer-readable storage medium storing instructions that, when executed by a processor, cause the processor to perform the method of claim 17.

* * * * *